(12) United States Patent
Fantinato et al.

(10) Patent No.: US 10,619,695 B2
(45) Date of Patent: Apr. 14, 2020

(54) GAS CYLINDER ACTUATOR WITH SAFETY DEVICE

(71) Applicant: SPECIAL SPRINGS S.R.L., Romano D'Ezzelino (IT)

(72) Inventors: Daniel Fantinato, Bassano del Grappa (IT); Massimo Fiorese, Bassano del Grappa (IT); Roberto Rech, Nove (IT)

(73) Assignee: SPECIAL SPRINGS S.R.L., Romano d'Ezzelino (IT)

( * ) Notice: Subject to any disclaimer, the term of this patent is extended or adjusted under 35 U.S.C. 154(b) by 30 days.

(21) Appl. No.: 15/631,552

(22) Filed: Jun. 23, 2017

(65) Prior Publication Data
US 2017/0370440 A1  Dec. 28, 2017

(30) Foreign Application Priority Data
Jun. 24, 2016 (IT) .......................... 102016000065690

(51) Int. Cl.
*F16F 9/43* (2006.01)
*F16F 9/02* (2006.01)
(Continued)

(52) U.S. Cl.
CPC ............ *F16F 9/432* (2013.01); *F16F 9/0218* (2013.01); *F16F 9/0272* (2013.01); *F16F 9/367* (2013.01);
(Continued)

(58) Field of Classification Search
CPC ....... F16F 9/43; F16F 2230/06; F16F 2230/24
See application file for complete search history.

(56) References Cited

U.S. PATENT DOCUMENTS

| 5,303,906 A | 4/1994 | Cotter et al. |
| 5,975,507 A * | 11/1999 | Cotter ................ F16F 9/43 |
| | | 267/64.11 |
| 6,431,332 B1 * | 8/2002 | Phelizot .............. F16F 9/435 |
| | | 188/376 |

FOREIGN PATENT DOCUMENTS

| CN | 102405360 A | 4/2012 |
| CN | 203421106 U | 2/2014 |

(Continued)

OTHER PUBLICATIONS

Chinese Office Action dated Nov. 21, 2019 received in Chinese Patent Application No. 201710468807.1.

*Primary Examiner* — F Daniel Lopez
(74) *Attorney, Agent, or Firm* — Scully, Scott, Murphy & Presser, P.C.

(57) ABSTRACT

A gas cylinder actuator with safety device, which comprises:
a tubular containment jacket,
two opposing heads for closing the tubular jacket, with corresponding sealing elements between the heads and the jacket, a first head provided with a through hole for the passage of a stem-piston, and a second head provided with a gas filling duct,
a stem-piston,
between the tubular jacket, the heads and the stem-piston there being a chamber for pressurized gas;
the second head has a seat for the accommodation of a flow control element of the gas filling duct and corresponding sealing means, the flow control element comprising a tab for controlling a retracting stroke of the stem-piston, the control tab protruding from a body that has a lightened portion for triggering a controlled fracture or deformation in the event the control tab is crushed by the stem-piston.

17 Claims, 2 Drawing Sheets

(51) Int. Cl.
　　　*F16F 9/36*　　　(2006.01)
　　　*F16F 9/48*　　　(2006.01)
(52) U.S. Cl.
　　　CPC .............. *F16F 9/43* (2013.01); *F16F 9/0227* (2013.01); *F16F 9/486* (2013.01); *F16F 2230/24* (2013.01)

(56) References Cited

FOREIGN PATENT DOCUMENTS

| | | |
|---|---|---|
| CN | 204153041 U | 2/2015 |
| CN | 105317904 A | 2/2016 |
| EP | 0897073 A2 | 2/1999 |
| EP | 0959263 A1 | 11/1999 |
| EP | 1041675 A2 | 10/2000 |
| EP | 3012480 A1 | 4/2016 |
| ES | 1041675 U | 7/1999 |
| WO | WO 2009/063003 A1 | 5/2009 |

\* cited by examiner

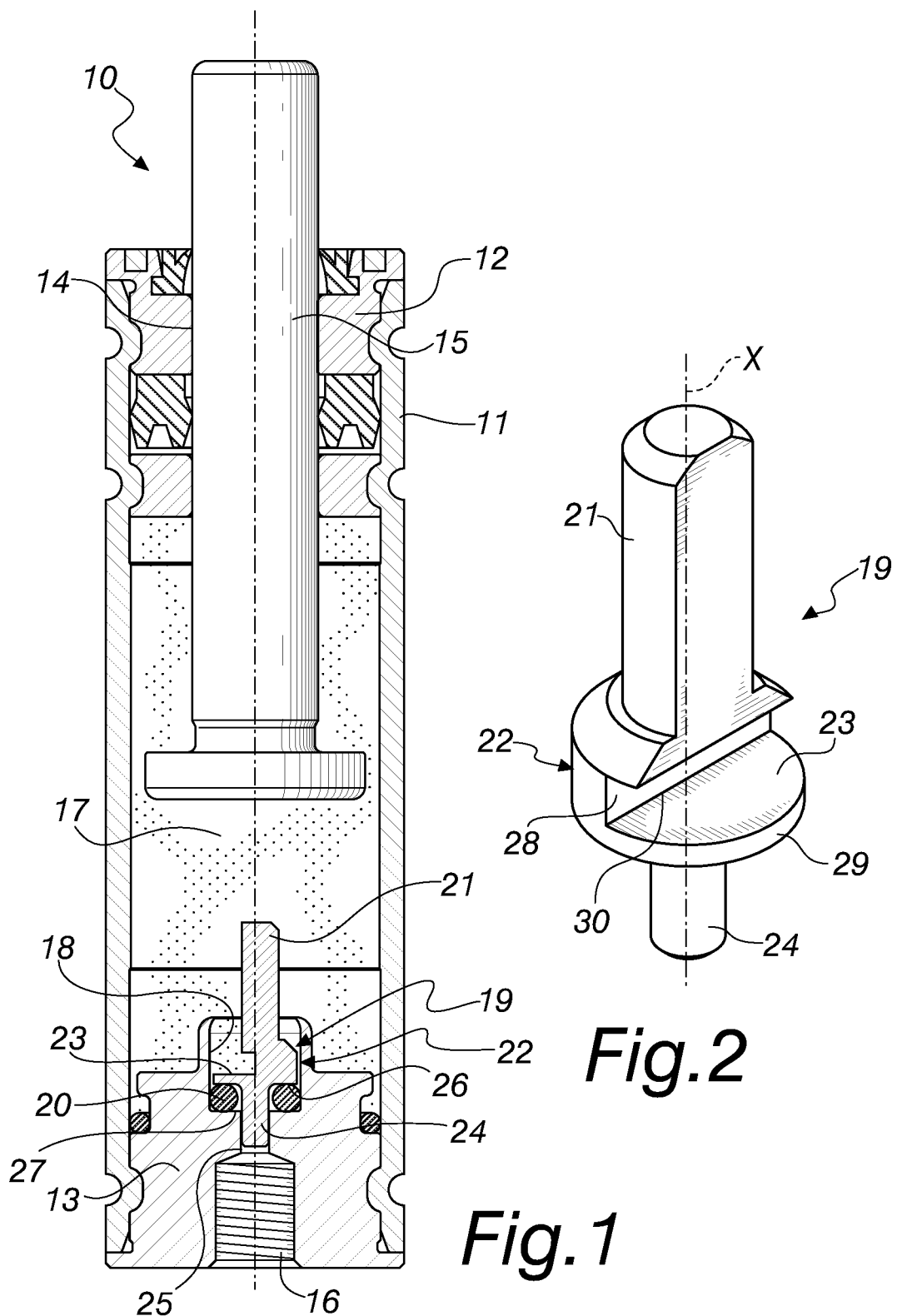

GAS CYLINDER ACTUATOR WITH SAFETY DEVICE

The present invention relates to a gas cylinder actuator with safety device.

Gas cylinder actuators generally have a tubular containment jacket that is closed hermetically at one end by a first perforated head for the passage of a stem with piston, which translates inside the jacket, and at the other end by a second head that has a hole or a conduit provided with a non-return valve for charging gas; the jacket, the end face and the head define the travel space for the piston, while the piston proper, with the jacket and the end face, defines the gas compression and expansion chamber present therein within the head.

Such gas cylinder actuators are typically, but not exclusively, also used in situations, such as in the use of mold dies, mold presses, and the like, in which they can be subjected to pressures such that they are susceptible of being damaged; such damage can render the gas cylinder actuator unusable, making replacement necessary and entailing the shutdown of the machine or plant in which it is deployed to operate, but such damage can also be such as to cause harm to an operator who happens to be in the vicinity, such as in the event of an explosion owing to overpressure, or breakage with uncontrolled outflow of pressurized gas.

One of the main causes of damage is associated with an 'overtravel' of the stem with piston, i.e. a retracting stroke that is greater than the permitted stroke which that specific gas cylinder actuator is built to handle.

Such 'overtravel' can be caused for example by an unexpected increase of load on the stem of the actuator, which forces the stem to re-enter the body of the actuator for a length not foreseen.

Such a situation can generate an overpressure inside the actuator, which can be unsustainable for the structure of the actuator overall; the actuator can thus bulge or split open, or it can break at the points where the parts that compose it are joined together, or the sealing elements can yield; in all these cases the result can be an unexpected, unwanted, and dangerous rapid outflow of gas.

Safety devices are known today for overtravel situations, which entail that a part of the actuator is deformed or broken in one or more preset points, in order to determine a controlled outflow in total safety of the overpressurized gas.

Such safety devices, although known and widespread, entail as mentioned the breakage of at least one essential component of the gas cylinder actuator, such as the end face, or the jacket, or the head, with consequent inevitable substitution of the entire gas cylinder actuator and consequent replacement costs.

The aim of the present invention is to provide a gas cylinder actuator with safety device that is safe and reliable in the event of overtravel of the stem-piston.

Within this aim, an object of the present invention is to provide a gas cylinder actuator in which the safety device does not induce deformation or breakage of its essential components such as the end face, jacket and head.

Another object of the present invention is to provide a gas cylinder actuator in which the safety device is simple to provide and to mount.

This aim and these and other objects which will become better apparent hereinafter are achieved by a gas cylinder actuator with safety device according to claim 1.

Further characteristics and advantages of the invention will become better apparent from the description of a preferred, but not exclusive, embodiment thereof, which is illustrated by way of non-limiting example in the accompanying tables of drawings wherein:

FIG. 1 is a cross-sectional side view of a gas cylinder actuator with safety device according to the invention;

FIG. 2 is a perspective view of a detail of the safety device according to the invention;

Figure 3:
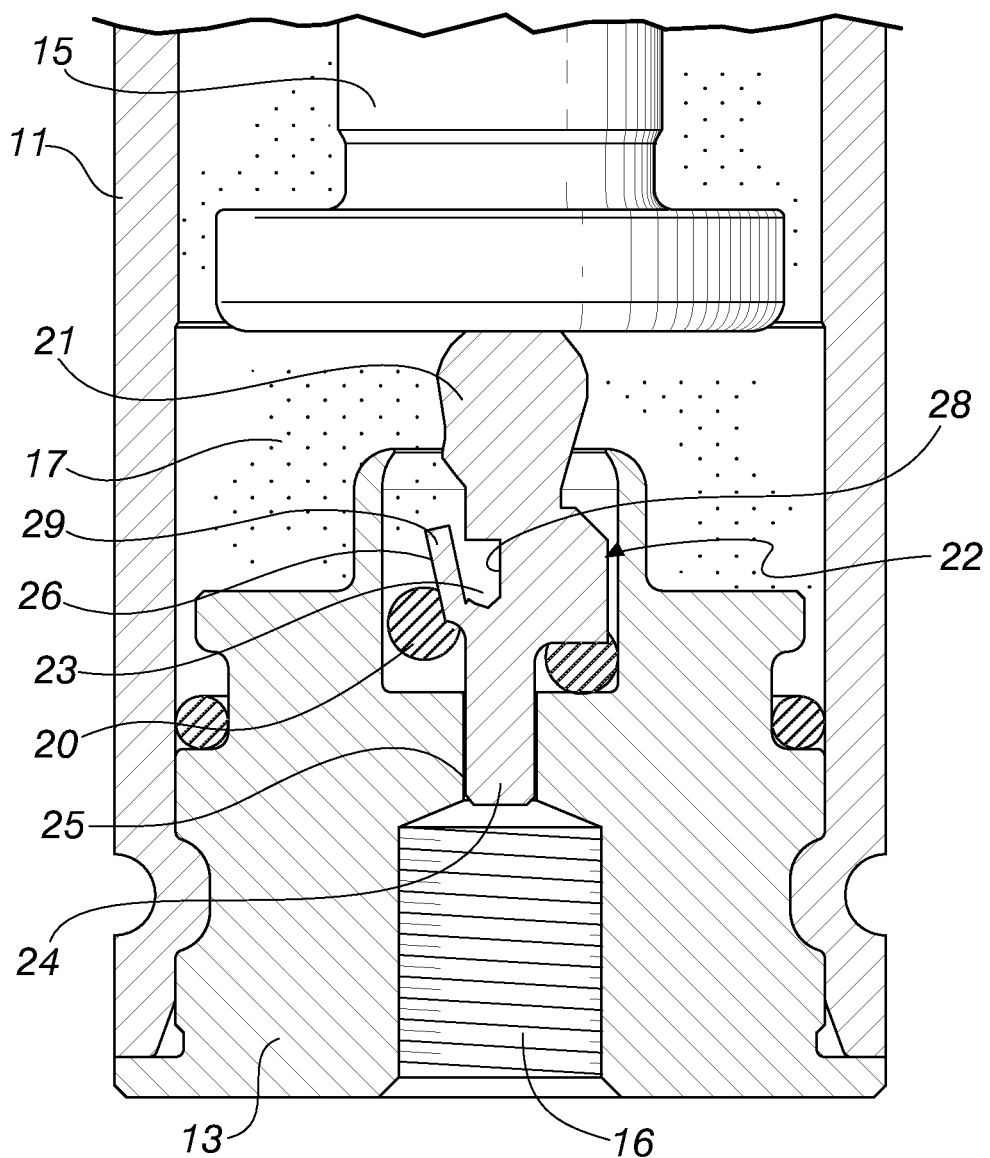
FIG. 3 is a cross-sectional view of the gas cylinder actuator according to the invention with the safety device in operation.

With reference to the figures, a gas cylinder actuator according to the invention is generally designated with the reference numeral 10.

The gas cylinder actuator 10 comprises:
- a tubular containment jacket 11,
- two opposing heads 12 and 13 for closing the tubular jacket 11, with corresponding sealing elements between the heads and the jacket, a first head 12 provided with a through hole 14 for the passage of a stem-piston 15, and a second head 13 provided with a gas filling duct 16,
- a stem-piston 15,
- between the tubular jacket 11, the heads 12 and 13 and the stem-piston 15 there being a chamber for pressurized gas 17.

The peculiarity of the gas cylinder actuator 10 consists in that the second head 13 has a seat 18 for accommodating a flow control element 19 of the gas filling duct 16 and corresponding sealing means 20.

The flow control element 19 comprises a tab 21 for controlling the retracting stroke of the stem-piston 15, the control tab 21 protruding from a body 22 that has a lightened portion 23 for triggering a controlled fracture or deformation in the event the control tab 21 is crushed by the stem-piston 15.

In particular, in the embodiment described herein by way of non-limiting example of the invention, the flow control element 19 comprises a centering stem 24, which is adapted to be inserted in a corresponding through hole 25 defined in the second head 13 and adapted to connect the gas filling duct 16 to the seat 18 for the flow control element 19, the seat 18 being in turn open onto the chamber 17.

Such centering stem 24 extends from the body 22 of the flow control element, on the opposite side with respect to the control tab 21.

In the present exemplary embodiment, the control tab 21 extends in an axial direction, i.e., parallel to the main axis of symmetry X of the gas cylinder actuator 10, i.e. the main axis of symmetry of the sleeve 11 and of the stem-piston 15.

In particular, the control tab 21 extends coaxially to the main axis of symmetry X of the gas cylinder actuator 10.

The body 22 of the flow control element 19 extends radially with respect to the centering stem 24, so as to define an annular surface 26 for compressing the sealing means 20.

Such sealing means 20 are constituted, for example, by a sealing ring, which is pressed between the bottom 27 of the seat 18 of the flow control element 19 and the annular compression surface 26 of the body 22 of the flow control element 19.

The body 22 of the flow control element 19 is substantially cylindrical.

The lightened portion 23 comprises a radial lightening recess 28, which extends through an arc of 180°, with respect to the main axis of the flow control element 19, coinciding with the main axis X of the gas cylinder actuator 10, so as to define a flat portion 29 of the body 22 that is adapted to be deformed by bending toward the tab 21, or to be broken, under the action of the thrust of the stem-piston 15, in an overtravel situation.

As is shown clearly in FIG. 3, in an overtravel situation, the stem-piston 15 impacts against and compresses the control tab 21, which partially deforms and partially pushes downward the flow control element 19, inducing the deformation of the lightened portion 23 of the body 22, and in particular the folding or the breakage of the flat base 29.

Owing to such folding or breakage of the flat base 29 of the body 22, the underlying annular compression surface 26 of that body 22 is no longer capable of effectively performing its task of compressing the sealing ring at least at the folded or broken flat base 29, and thus the seal of the sealing means 20 fails and creates an escape route for the overpressurized gas inside the chamber 17.

Between the centering stem 24 and the through hole 25 that contains it there is play that is such as to allow the passage of gas.

In practice it has been found that the invention thus described provides a solution to the intended aim and objects.

In particular with the present invention a gas cylinder actuator with safety device has been provided that is safe and reliable in the event of overtravel of the stem-piston.

Furthermore, with the invention a gas cylinder actuator has been devised in which the safety device does not induce deformation or breakage of its essential components such as the end face, the jacket and the head, by virtue of the flow control element conveniently positioned and contoured to absorb the stresses originating from the stem-piston in an overtravel situation in place of the other parts of the gas cylinder actuator, and at the same time capable of deforming as a result of such stresses so as to open an escape route for the pressurized gas.

What is more, with the invention a gas cylinder actuator has been devised in which the safety device is simple to provide and to mount.

The invention thus conceived is susceptible of numerous modifications and variations, all of which are within the scope of the appended claims.

In practice the components and materials employed, provided they are compatible with the specific use, and the dimensions, may be any according to requirements and to the state of the art.

The disclosures in Italian Patent Application No. 102016000065690 (UA2016A004635) from which this application claims priority are incorporated herein by reference.

What is claimed is:

1. A gas cylinder actuator with safety device, which comprises:
    a tubular containment jacket,
    a stem-piston,
    two opposing heads for closing said tubular jacket, with corresponding sealing elements between the heads and the jacket, the two opposing heads comprising a first head and a second head, wherein the first head is provided with a through hole for the passage of the stem-piston, and the second head is provided with a gas filling duct,
    between said tubular jacket, said heads and said stem-piston there being a chamber for pressurized gas, wherein said second head has a seat for the accommodation of a flow control element of the gas filling duct and corresponding sealing means, said flow control element comprising a control tab for controlling a retracting stroke of said stem-piston, said control tab protruding from a body that has a lightened portion for triggering a controlled fracture or deformation in the event said control tab is crushed by said stem-piston, and wherein the control tab extends coaxially to a main axis of symmetry of the gas cylinder actuator.

2. The gas cylinder actuator according to claim 1, wherein said flow control element comprises a centering stem, which is adapted to be inserted in a corresponding through hole defined in the second head and adapted to connect the gas filling duct to the seat for the flow control element, said seat being in turn open onto the chamber.

3. The gas cylinder actuator according to claim 2, wherein said centering stem protrudes from the body of the flow control element on the opposite side with respect to the control tab.

4. The gas cylinder actuator according to claim 2, wherein said body of the flow control element extends radially with respect to the centering stem, so as to define an annular surface for compressing the sealing means.

5. The gas cylinder actuator according to claim 4, wherein said sealing means are constituted by a sealing ring, which is pressed between a bottom of the seat that accommodates the flow control element and the annular compression surface of the body of said flow control element.

6. The gas cylinder actuator according to claim 2, wherein between the centering stem and the through hole that contains said stem there is play that is such as to allow the passage of gas.

7. The gas cylinder actuator according to claim 1, wherein said body of the flow control element is substantially cylindrical.

8. The gas cylinder actuator according to claim 1, wherein said lightened portion comprises a radial lightening recess, which extends through an arc of 180°, with respect to a main axis of the flow control element, so as to define a flat portion of the body that is adapted to be deformed by bending toward the tab, or to be broken, under the action of the thrust of the stem-piston, in the event said control tab is crushed by said stem-piston.

9. A gas cylinder actuator with safety device, which comprises:
    a tubular containment jacket,
    a stem-piston,
    two opposing heads for closing said tubular jacket, with corresponding sealing elements between the heads and the jacket, the two opposing heads comprising a first head and a second head, wherein the first head is provided with a through hole for the passage of the stem-piston, and the second head is provided with a gas filling duct,
    between said tubular jacket, said heads and said stem-piston there being a chamber for pressurized gas, wherein said second head has a seat for the accommodation of a flow control element of the gas filling duct and corresponding sealing means, said flow control element comprising a control tab for controlling a retracting stroke of said stem-piston, said control tab protruding from a body that has a lightened portion for triggering a controlled fracture or deformation in the event said control tab is crushed by said stem-piston, wherein said lightened portion comprises a radial lightening recess, which extends through an arc of 180°, with respect to a main axis of the flow control element, so as to define a flat portion of the body that is adapted to be deformed by bending toward the tab, or to be broken, under the action of the thrust of the stem-piston, in the event said control tab is crushed by said stem-piston.

10. The gas cylinder actuator according to claim 9, wherein said flow control element comprises a centering stem, which is adapted to be inserted in a corresponding through hole defined in the second head and adapted to connect the gas filling duct to the seat for the flow control element, said seat being in turn open onto the chamber.

11. The gas cylinder actuator according to claim 10, wherein said centering stem protrudes from the body of the flow control element on the opposite side with respect to the control tab.

12. The gas cylinder actuator according to claim 10, wherein said body of the flow control element extends radially with respect to the centering stem, so as to define an annular surface for compressing the sealing means.

13. The gas cylinder actuator according to claim 12, wherein said sealing means are constituted by a sealing ring, which is pressed between a bottom of the seat that accommodates the flow control element and the annular compression surface of the body of said flow control element.

14. The gas cylinder actuator according to claim 10, wherein between the centering stem and the through hole that contains said stem there is play that is such as to allow the passage of gas.

15. The gas cylinder actuator according to claim 9, wherein said control tab extends in an axial direction, i.e., parallel to a main axis of symmetry of the gas cylinder actuator.

16. The gas cylinder actuator according to claim 9, wherein the control tab extends coaxially to a main axis of symmetry of the gas cylinder actuator.

17. The gas cylinder actuator according to claim 9, wherein said body of the flow control element is substantially cylindrical.

* * * * *